United States Patent
Chiang

(10) Patent No.: US 9,537,941 B2
(45) Date of Patent: Jan. 3, 2017

(54) METHOD AND SYSTEM FOR VERIFYING QUALITY OF SERVER

(71) Applicant: Wistron Corporation, New Taipei (TW)

(72) Inventor: Min-Kuei Chiang, New Taipei (TW)

(73) Assignee: Wistron Corporation, New Taipei (TW)

( * ) Notice: Subject to any disclaimer, the term of this patent is extended or adjusted under 35 U.S.C. 154(b) by 384 days.

(21) Appl. No.: 14/165,464

(22) Filed: Jan. 27, 2014

(65) Prior Publication Data

US 2015/0172131 A1 Jun. 18, 2015

(30) Foreign Application Priority Data

Dec. 17, 2013 (TW) .............................. 102146708 A

(51) Int. Cl.
*H04L 29/08* (2006.01)
*H04L 12/24* (2006.01)

(52) U.S. Cl.
CPC ....... *H04L 67/1008* (2013.01); *H04L 41/5096* (2013.01); *H04L 67/1097* (2013.01); *H04L 67/125* (2013.01); *H04L 41/5009* (2013.01); *H04L 67/1002* (2013.01)

(58) Field of Classification Search
USPC . 709/224, 203; 711/104, 113, 114; 707/697, 687, 674
See application file for complete search history.

(56) References Cited

U.S. PATENT DOCUMENTS

| | | | |
|---|---|---|---|
| 7,904,508 B2 | 3/2011 | Bernabeu-Auban et al. | |
| 7,992,039 B2 * | 8/2011 | Belyakov | H04L 67/1097 714/16 |
| 8,280,994 B2 * | 10/2012 | Blouin | H04L 41/5006 370/216 |
| 8,402,250 B1 * | 3/2013 | Juillard | G06F 17/30159 711/154 |
| 8,639,669 B1 * | 1/2014 | Douglis | G06F 17/30159 707/692 |

(Continued)

FOREIGN PATENT DOCUMENTS

TW I396093 5/2013

OTHER PUBLICATIONS

"Office Action of Taiwan Counterpart Application with partial English translation", issued on Oct. 28, 2015, p. 1-p. 6.

*Primary Examiner* — Tammy Nguyen
(74) *Attorney, Agent, or Firm* — Jianq Chyun IP Office

(57) ABSTRACT

A method and a system for verifying quality of server thereof are provided. The method and the system are used for verifying a plurality of servers constructed in a server cluster. The method includes: installing a cloud computing platform in the servers, creating an input file folder on a cloud computing platform file system included in the cloud computing platform and storing calculation data into the input file folder. The method further includes: creating a plurality of mapreduce tasks corresponding to a calculation job by the servers and distributively executing the mapreduce tasks by using a mapreduce frame included in the cloud computing platform to obtain a plurality of calculation results, and storing and analyzing the calculation results to verify a quality of each of the servers. Accordingly, the method is capable of conformably verifying quality of servers in the server cluster.

12 Claims, 4 Drawing Sheets

(56) References Cited

U.S. PATENT DOCUMENTS

| | | | |
|---|---|---|---|
| 8,712,963 B1* | 4/2014 | Douglis | G06F 11/2094 |
| | | | 707/625 |
| 8,713,282 B1* | 4/2014 | Rajimwale | G06F 3/0644 |
| | | | 711/173 |
| 8,756,249 B1* | 6/2014 | Wallace | G06F 17/30106 |
| | | | 707/687 |
| 8,825,626 B1* | 9/2014 | Wallace | G06F 17/30994 |
| | | | 707/697 |
| 8,862,818 B1* | 10/2014 | Ozdemir | G06F 3/0689 |
| | | | 711/114 |
| 9,026,499 B1* | 5/2015 | Rajimwale | G06F 17/30893 |
| | | | 707/674 |
| 9,298,726 B1* | 3/2016 | Mondal | G06F 17/30159 |
| 9,449,090 B2* | 9/2016 | Neumeier | G06F 17/30858 |
| 2002/0069318 A1* | 6/2002 | Chow | G06F 3/0611 |
| | | | 711/104 |
| 2002/0124137 A1* | 9/2002 | Ulrich | G06F 3/0613 |
| | | | 711/113 |
| 2002/0138559 A1* | 9/2002 | Ulrich | G06F 17/30067 |
| | | | 709/203 |
| 2003/0081560 A1 | 5/2003 | Honda | |
| 2013/0124483 A1 | 5/2013 | Furuhashi et al. | |
| 2014/0006597 A1* | 1/2014 | Ganguli | G06F 9/5072 |
| | | | 709/224 |

\* cited by examiner

METHOD AND SYSTEM FOR VERIFYING QUALITY OF SERVER

CROSS-REFERENCE TO RELATED APPLICATION

This application claims the priority benefit of Taiwan application serial no. 102146708, filed on Dec. 17, 2013. The entirety of the above-mentioned patent application is hereby incorporated by reference herein and made a part of this specification.

BACKGROUND OF THE INVENTION

Field of the Invention

The invention relates to a method and a system for verifying quality of server, and more particularly to a method and a system for verifying quality of servers for a plurality of servers constructed in a server cluster.

Description of Related Art

In recent years, with the rapid spread of the Internet and improvements in software and hardware technology, demands for information services are increasingly high in many companies. Accordingly, an integrated computer with high-speed calculation and massive storage capability formed by combining numerous servers through Internet is widely used by companies nowadays. For server manufacturers, servers trends to mass production. Namely, as the servers are developed more complex in terms of both function and structure, it is more difficult to verify quality of the servers.

Traditionally, in the era when the servers are still operated independently from one another, when it comes to verify quality of the servers, since each of the servers may include a functional verification which is individually designed, there will not be any problem even if the servers are operated in the same room. However, today's servers are of server types mainly based on Blade Server or Rack Mount server, thus various resources are usually connected and shared between the servers. In other words, services provided by the servers are no longer completed by single server alone. Currently, in the field for verifying quality of server, methods for verifying quality of server still stay in verifying hardware, firmware and software for one single server. Accordingly, how to maintain stability of each server under operations by numerous servers while providing higher performance in verifying quality of the numerous servers in a server cluster has become a major issue to be solved in the field for verifying quality of server.

SUMMARY OF THE INVENTION

The invention is directed to a method and a system for verifying quality of server, capable of verifying numerous servers in a server cluster through a cloud computing platform at the same time, so as to ensure quality of the servers.

The invention provides a method for verifying quality of server, used for verifying a plurality of servers constructed in a server cluster. The method includes: installing a cloud computing platform in the servers in the server cluster, and the cloud computing platform includes a cloud computing platform file system and a mapreduce frame; creating an input file folder on the cloud computing platform file system and storing a calculation data into the input file folder; creating a plurality of mapreduce tasks corresponding to a calculation job by the servers, accessing the calculation data in the input file folder, and distributively executing the mapreduce tasks by using the mapreduce frame to obtain a plurality of calculation results; and storing and analyzing the calculation results to verify a quality of each of the servers.

In an exemplary embodiment of the invention, the servers further include a main server and a plurality of node servers, and the step of creating the mapreduce tasks corresponding to the calculation job by the servers, accessing the calculation data in the input file folder, and distributively executing the mapreduce tasks by using the mapreduce frame to obtain the calculation results includes: dividing the calculation job into the mapreduce tasks by the main server; assigning the mapreduce tasks to the main server and the node servers; and executing the mapreduce tasks respectively by the main server and the node servers.

In an exemplary embodiment of the invention, the method for verifying quality of server further includes: after installing the cloud computing platform in the servers in the server cluster, writing a name of the main server and names of the node servers into a corresponding profile; restarting the cloud computing platform installed in the servers; determining whether the node servers are connected to the main server; and if the node servers are not connected to the main server, restarting the cloud computing platform.

In an exemplary embodiment of the invention, the cloud computing platform further includes a distributed data storage system, and the step of storing the calculation results includes: transmitting the calculation results to the distributed data storage system and storing the calculation results into a database.

In an exemplary embodiment of the invention, the step of analyzing the calculation results to verify the quality of each of the servers includes: determining an operation condition of each of the servers during execution of the calculation job according to a registry generated after the calculation job is executed by the server cluster.

In an exemplary embodiment of the invention, the step of executing the mapreduce tasks respectively by the main server and the node servers includes: reading the calculation data from the input file folder by the main server and the node servers and executing a plurality of mappers in the mapreduce tasks for the calculation data; and executing a plurality of reducers in the mapreduce tasks according to the calculation results by the main server and the node servers.

In an exemplary embodiment of the invention, the calculation job is a square root calculation.

The invention provides a system for verifying quality of server, used for a plurality of servers constructed in a server cluster. The system includes a calculation platform installing module, a file and data creating module, a server calculation module, a calculation result processing module, and a calculation result analysis module. The calculation platform installing module is configured to install a cloud computing platform in the servers, and the cloud computing platform includes a cloud computing platform file system and a mapreduce frame. The file and data creating module is configured to create an input file folder on the cloud computing platform file system and storing a calculation data into the input file folder. The server calculation module is configured to control each of the servers to create a plurality of mapreduce tasks corresponding to a calculation job, access the calculation data in the input file folder, and distributively execute the mapreduce tasks by using the mapreduce frame to obtain a plurality of calculation results. The calculation result processing module is configured to process and storing the calculation results. The calculation result analysis module is configured to analyze the calculation results to verify a quality of each of the servers.

In an exemplary embodiment of the invention, the servers further include a main server and a plurality of node servers.

In an exemplary embodiment of the inventions, the server calculation module is further configured to control the main server to assign the mapreduce tasks to the main server and the node servers, and the server calculation module is further configured to control the main server and the node servers to execute the mapreduce tasks respectively.

In an exemplary embodiment of the invention, the system further includes a server setting module. The server setting module is configured to, after installing the cloud computing platform in the servers in the server cluster, write names of the main server and the node servers into a corresponding profile. The server setting module is further configured to restart the cloud computing platform installed in the servers, and determining whether the node servers are connected to the main server. If the node servers are not connected to the main server, the server setting module restarts the cloud computing platform.

In an exemplary embodiment of the invention, the cloud computing platform further includes a distributed data storage system.

In an exemplary embodiment of the invention, the calculation result processing module is further configured to transmit the calculation results to the distributed data storage system and store the calculation results into a database.

In an exemplary embodiment of the invention, the calculation result analysis module is further configured to determine an operation condition of each of the servers during execution of the calculation job according to a registry generated after the calculation job is executed by the server cluster.

In an exemplary embodiment of the invention, the server calculation module is further configured to control the main server and the node servers to read the calculation data from the input file folder and execute a plurality of mappers in the mapreduce tasks for the calculation data, and control the main server and the node servers to execute a plurality of reducers in the mapreduce tasks according to the calculation results.

In an exemplary embodiment of the invention, the calculation job is a square root calculation.

Based on above, in the method and the system for verifying quality of server according to the invention, numerous servers are serially connected through the cloud computing platform for conformably verifying quality of numerous servers in the server cluster, which may effectively improve performance for verifying quality of server.

To make the above features and advantages of the disclosure more comprehensible, several embodiments accompanied with drawings are described in detail as follows.

DESCRIPTION OF THE EMBODIMENTS

In order to improve performance for verifying quality of the server cluster, numerous servers are serially connected through a cloud computing platform for verifying quality of a plurality of server in the server cluster at the same time. Accordingly, performance for verifying quality of the servers may be improved, and quality of each server may be ensured by conformably verifying the same.

Figure 1:
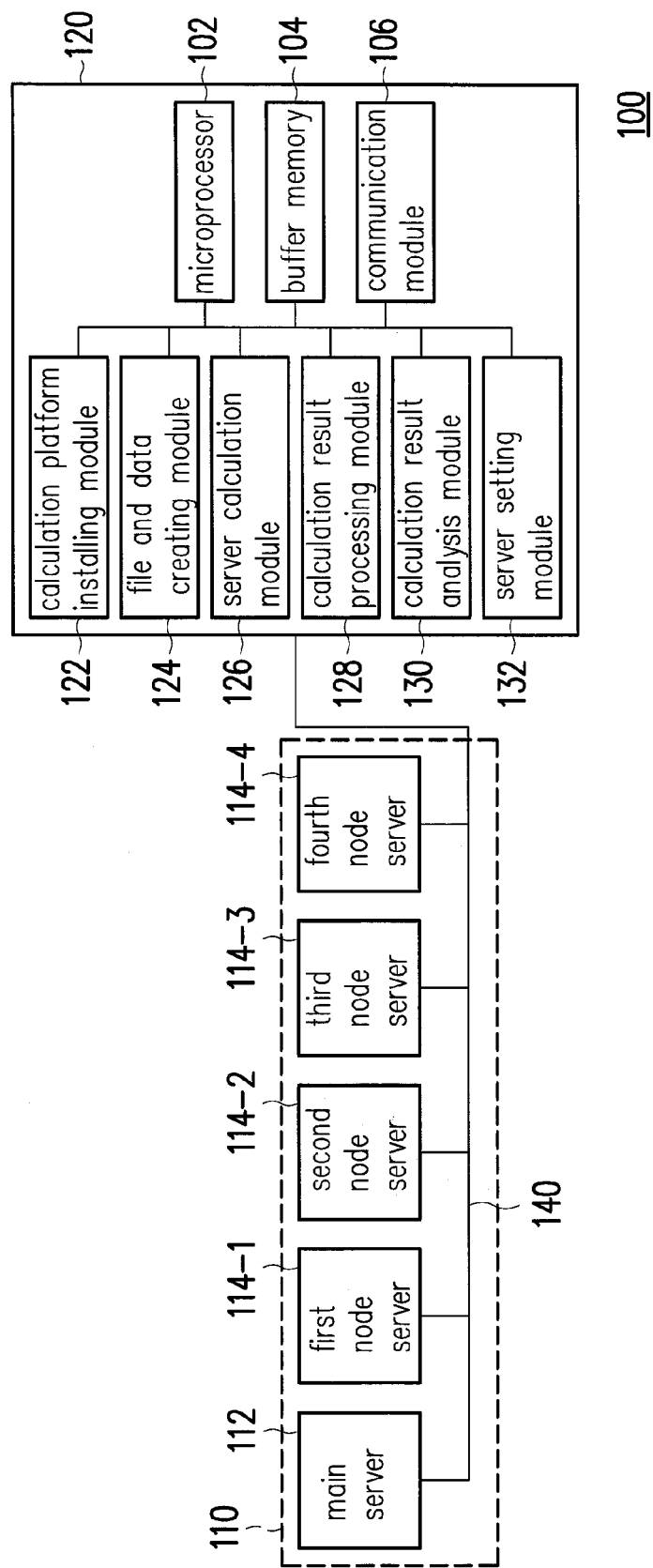
FIG. 1 is a block diagram illustrating a system architecture for verifying quality of server according to an exemplary embodiment of the invention.

FIG. 1 is a block diagram illustrating a system architecture for verifying quality of server according to an exemplary embodiment of the invention. It should be understood that, the example of FIG. 1 is merely exemplary, and the invention is not limited thereto.

Referring to FIG. 1, a system architecture 100 for verifying quality of server includes a server cluster 110 and a system 120 for verifying quality of server. The server cluster 110 includes a main server 112, a first node server 114-1, a second node server 114-2, a third node server 114-3 and a fourth node server 114-4. It should be noted that, it is illustrated with one main server and four node servers for example, but the invention is not limited thereto. For instance, the system architecture 100 for verifying quality of server may include a plurality of server clusters, and each of the server clusters may include more servers.

The main server 112, the first node server 114-1, the second node server 114-2, the third node server 114-3 and the fourth node server 114-4 are connected to one another through a network 140. Herein, the network 140 may be a wired network or a wireless network.

The system 120 for verifying quality of server is connected to the main server 112, the first node server 114-1, the second node server 114-2, the third node server 114-3 and the fourth node server 114-4 through the network 140, and used for verifying the first node server 114-1, the second node server 114-2, the third node server 114-3 and the fourth node server 114-4 constructed in the server cluster 110.

The system 120 for verifying quality of server includes a microprocessor 102, a buffer memory 104, a communication module 106, a calculation platform installing module 122, a file and data creating module 124, a server calculation module 126, a calculation result processing module 128, a calculation result analysis module 130 and a server setting module 132.

The microprocessor 102 is configured to control overall operations of the system 120 for verifying quality of server. For instance, the microprocessor 102 may be a central processing unit (CPU). Particularly, the microprocessor 102 may issue commands to the system 120 for verifying quality of server thereby verifying quality of servers in the server cluster 110.

The buffer memory 104 is coupled to the microprocessor 102, and configured to temporarily store the commands executed by the microprocessor 102, or data. For instance, in the present exemplary embodiment, the buffer memory 104 may be a Dynamic Random Access Memory (DRAM), or a Static Random Access Memory (SRAM) and the like.

Nevertheless, it should be understood that the invention is not limited thereto, and the buffer memory 104 may also be other appropriate memories.

The communication module 106 is coupled to the microprocessor 102, and configured to communicate with the servers in the server cluster 110. For instance, the communication module 106 may be a wired or wireless communication module.

Figure 2:
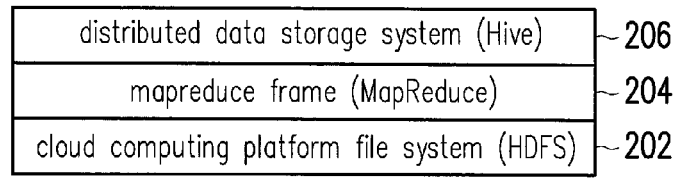
FIG. 2 is a block diagram illustrating a cloud computing platform according to an exemplary embodiment of the invention.

FIG. 2 is a block diagram illustrating a cloud computing platform according to an exemplary embodiment of the invention.

Referring to FIG. 2, a cloud computing platform 200 based on Hadoop is capable of providing an environment for distributed calculations of mass data. The cloud computing platform 200 includes a cloud computing platform file system (Hadoop Distributed File System; HDFS) 202, a mapreduce frame (MapReduce) 204, a distributed data storage system (Hive) 206.

More specifically, the cloud computing platform file system 202 is capable of providing numerous storage spaces, and used for storing the mass data in the cloud computing platform 200 and the temporary files generated during calculations.

The mapreduce frame 204 is constructed on the cloud computing platform file system 202, and configured to execute the distributed calculations for the mass data stored in the cloud computing platform file system 202 in the server cluster. The distributed calculations may be applications including inquiring, indexing, sorting, data-mining for large data set, and website access analysis for large websites.

The distributed data storage system 206 is configured to manage data stored in the cloud computing platform file system 202. The distributed data storage system 206 may inquire for the data stored in the cloud computing platform file system 202 by executing a query language based on SQL.

In the present exemplary embodiment, the calculation platform installing module 122 is configured to install the cloud computing platform 200 depicted in FIG. 2 in the main server 112, the first node server 114-1, the second node server 114-2, the third node server 114-3 and the fourth node server 114-4 in the server cluster.

Figure 3:
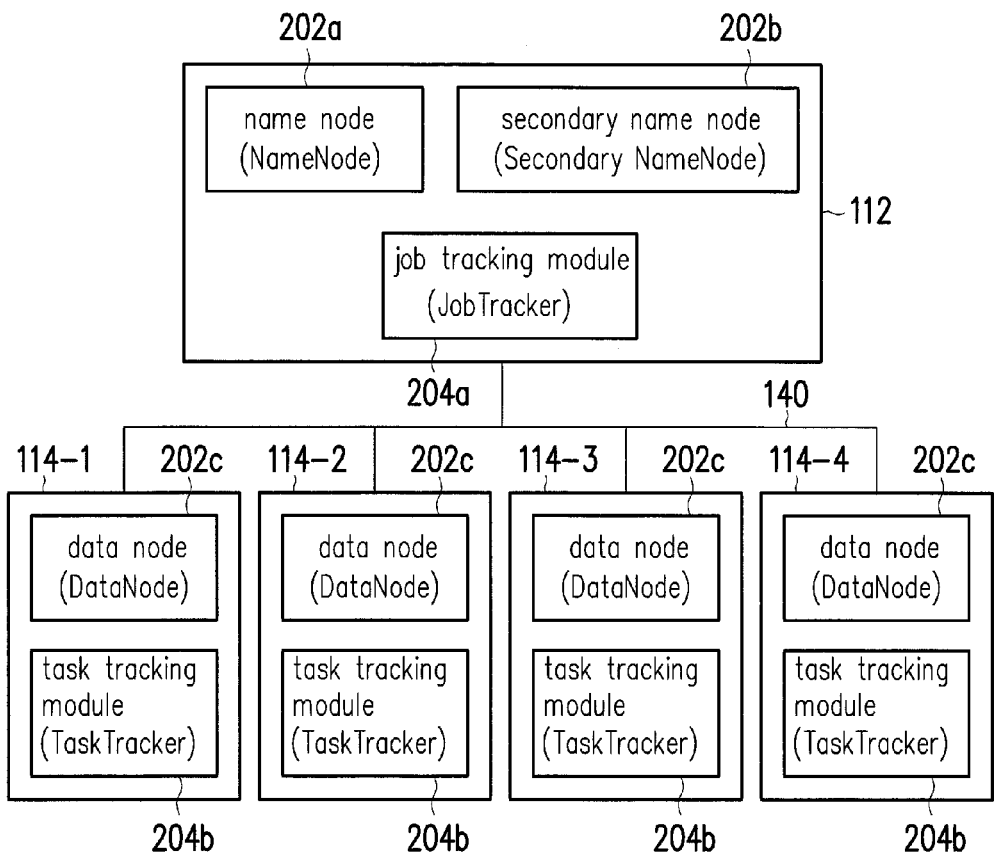
FIG. 3 is a block diagram illustrating a server cluster installed with the cloud computing platform according to an exemplary embodiment of the invention.

FIG. 3 is a block diagram illustrating a server cluster installed with the cloud computing platform according to an exemplary embodiment of the invention.

Referring to FIG. 3, after the cloud computing platform 200 is installed in each server in the server cluster 110 by the calculation platform installing module 122, the main server 112 and each of the node servers (114-1 to 114-4) may form an architecture as depicted in FIG. 3. More specifically, the main server 112 may include a name node (NameNode) 202*a* and a secondary name node (Secondary NameNode) 202*b* provided by the cloud computing platform file system 202 as well as a job tracking module (JobTracker) 204*a* provided by the mapreduce frame 204. Further, each of the node servers (114-1 to 144-4) may include a data node (DataNode) 202*c* provided by the cloud computing platform file system 202 as well as a task tracking module (TaskTracker) 204*b* provided by the mapreduce frame 204.

Referring back to FIG. 1, the file and data creating module 124 is used for creating an input file folder on the cloud computing platform file system 202 and storing a calculation data into the input file folder.

The server calculation module 126 is configured to control each of the node servers (114-1 to 114-4) to create a plurality of mapreduce tasks corresponding to a calculation job, access the calculation data in the input file folder, and distributively execute the mapreduce tasks by using the mapreduce frame 204 to obtain a plurality of calculation results.

The calculation result processing module 128 is configured to process and store the calculation results.

The calculation result analysis module 130 is configured to analyze the calculation results thereby verifying a quality of each of the node servers (114-1 to 114-4).

Figure 4:
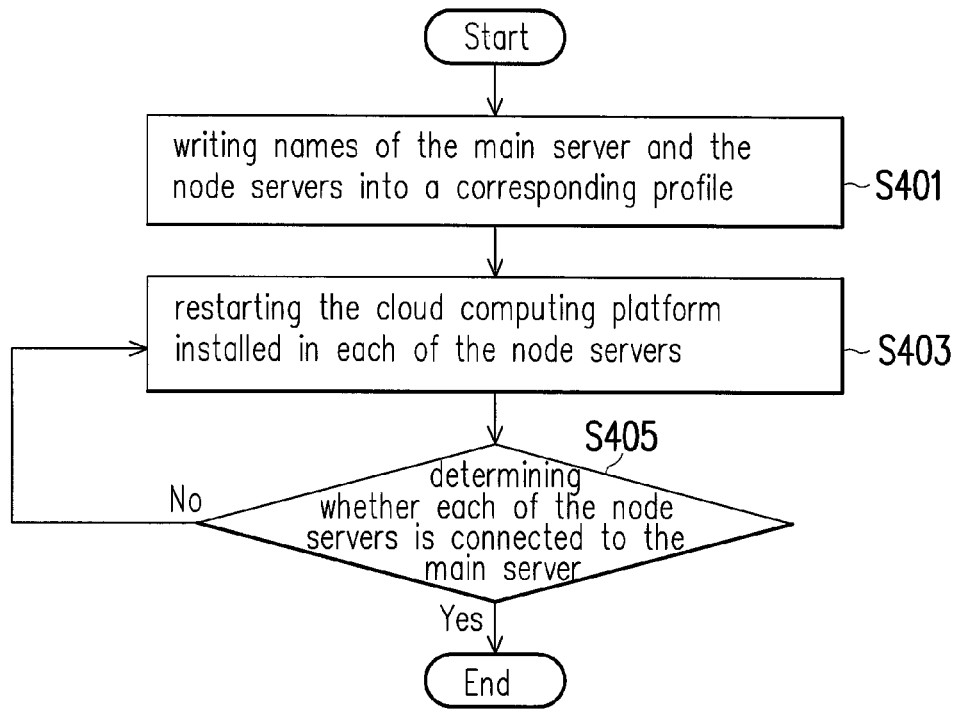
FIG. 4 is a flowchart illustrating a setting method of a profile for the cloud computing platform and the servers according to an exemplary embodiment of the invention.

FIG. 4 is a flowchart illustrating a setting method of a profile for the cloud computing platform and the servers according to an exemplary embodiment of the invention.

Referring to FIG. 4, in step S401, after installing the cloud computing platform 200 in all the servers in the server cluster 110, the server setting module 132 may write names of the main server 112 and the node servers (114-1 to 114-4) into a corresponding profile. For instance, the server setting module 132 may write IP addresses and the names of the main server 112 and each of the node servers (114-1 to 114-4) into a file "hosts" under a path "%WinDir%\system32\drivers\etc" in the main server 112, and write the name of the main server 112 and the name of each of the node servers (114-1 to 114-4) into files "master" and "slaves", respectively, under a path "C:\Hadoop\hadoop-1.1.0-SNAPSHOT\conf\".

In the present exemplary embodiment, the profile of the cloud computing platform further includes "core-site.xml", "mapred-site.xml" and "hdfs-site.xml" which are also under the path "C:\Hadoop\hadoop-1.1.0-SNAPSHOT\conf\". Therefore, in step S401, the server setting module 132 may further set names of all "localhost" in the profiles in the main server 112 and each of the node servers (114-1 to 114-4) to the name of the main server 112.

Subsequently, in step S403, the server setting module 132 may restart the cloud computing platform 200 installed in each of the servers.

Thereafter, in step S405, the server setting module 132 may determine whether each of the node servers (114-1 to 114-4) is connected to the main server 112. If the server setting module 132 determines that each of the node servers (114-1 to 114-4) is not connected to the main server 112, go back to step S403 in which the server setting module 132 restarts the cloud computing platform 200 in each of the severs.

Figure 5:
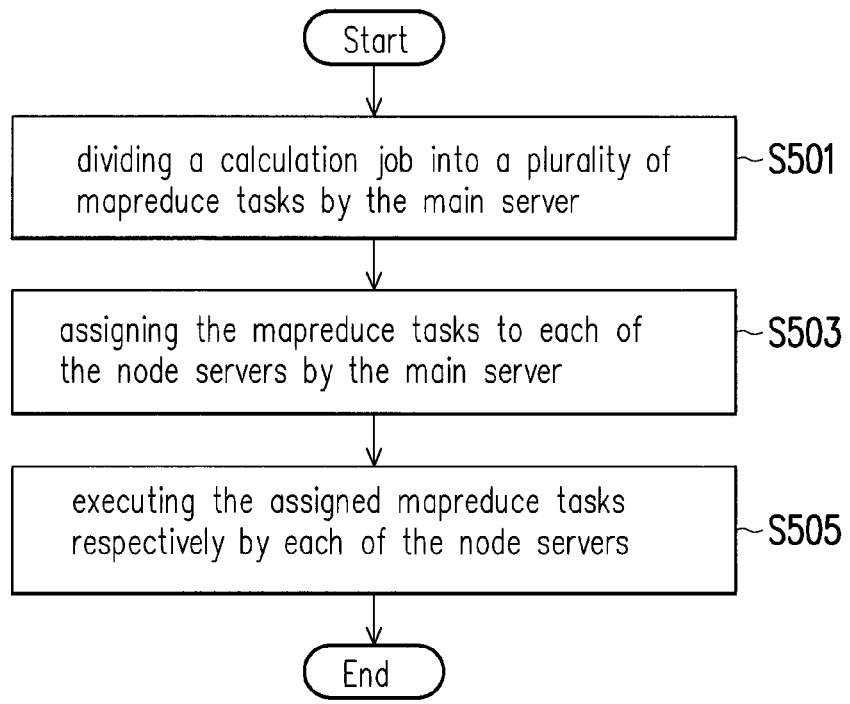
FIG. 5 is a flowchart illustrating an assigning method of a calculation job for verifying quality of server according to an exemplary embodiment of the invention.

FIG. 5 is a flowchart illustrating an assigning method of a calculation job for verifying quality of server according to an exemplary embodiment of the invention.

Referring to FIG. 5, in step S501, the server calculation module 126 may control the main server 112 to divide the calculation job into the mapreduce tasks.

In step S503, the server calculation module 126 is further used for controlling the job tracking module 204*a* in the main server to assign a plurality of mapreduce tasks to the task tracking module 204*b* in each of the node servers (114-1 to 114-4).

Subsequently, in step S505, the server setting module 126 may control the task tracking module 204*b* in each of the node servers (114-1 to 114-4) to execute the mapreduce tasks being assigned, respectively.

It should be noted that, in the present exemplary embodiment, the mapreduce task as described in step S505 is composed of a mapper and a reducer. Particularly, the server setting module 126 may control each of the node servers (114-1 to 114-4) to read a calculation data from an input file folder and execute a plurality of mappers in the mapreduce tasks, and may control each of the node servers (1141 to 114-4) to execute a plurality of reducers in the mapreduce tasks according to calculation results.

In the present exemplary embodiment, the calculation result processing module 128 is further used for transmitting the calculation results to the distributed data storage system 206 and storing the calculation results into a database. More specifically, the distributed data storage system 206 may further include a database (Hbase, not illustrated), and said database is a distributed database on the distributed data storage system 206 for storing distributed data and the calculation results.

In another exemplary embodiment of the invention, the calculation result analysis module 130 is further used for determining an operation condition of each of the node servers (114-1 to 114-4) during execution of the calculation job according to a registry generated after the calculation job is executed by the server cluster 110.

Figure 6:
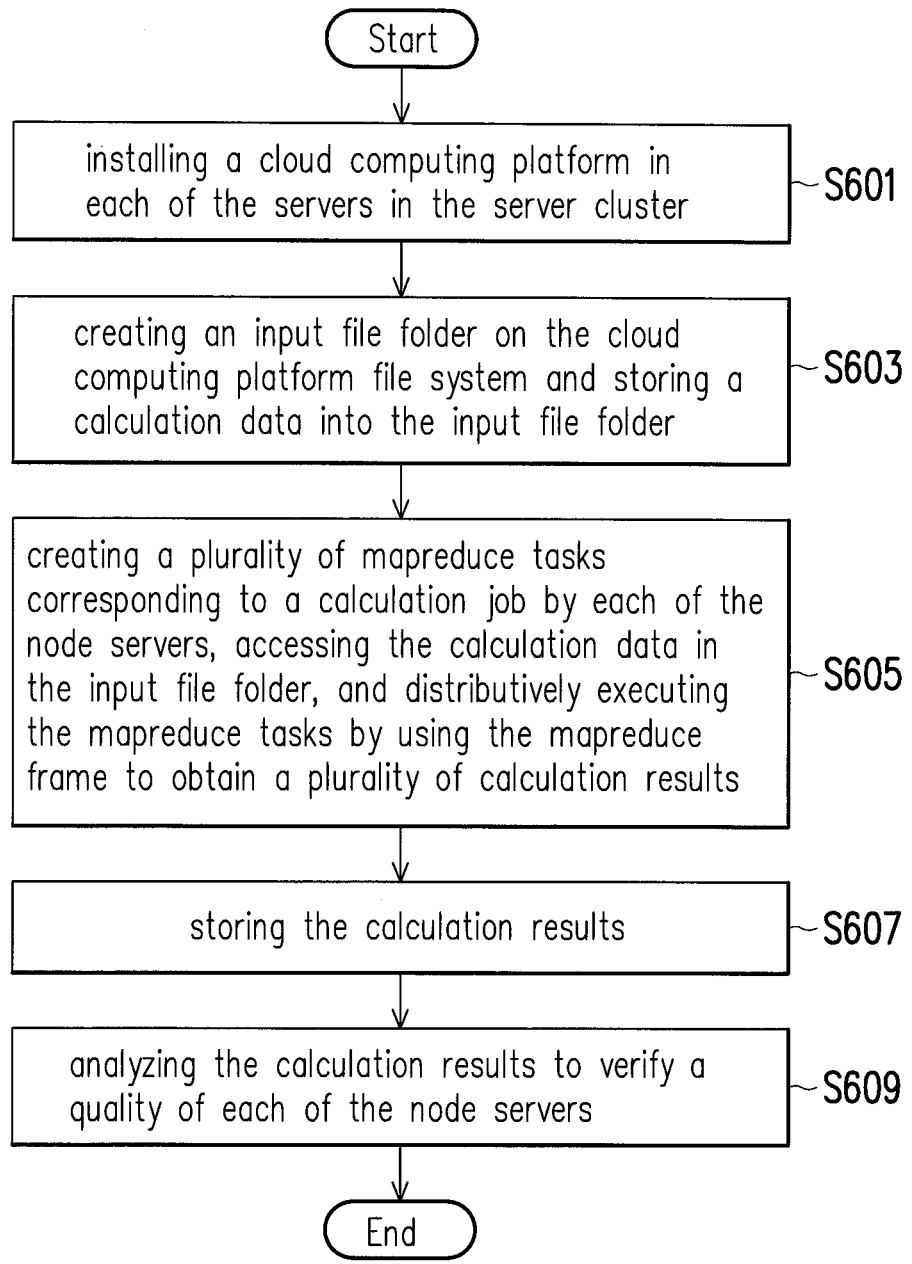
FIG. 6 is a flowchart illustrating a method for verifying quality of server according to another exemplary embodiment of the invention.

FIG. 6 is a flowchart illustrating a method for verifying quality of server according to another exemplary embodiment of the invention.

Referring to FIG. 6, firstly, in step S601, the calculation platform installing module 122 may install the cloud computing platform 200 on each of the servers in the server cluster 110.

Subsequently, in step S603, the file and data creating module 124 may create an input file folder on the cloud computing platform file system 202 and store a calculation data into the input file folder. For instance, the file and data creating module 124 may use a cloud computing platform shell command (Hadoop shell) such as "hadoop fs-mkdir Input/sqrt" to create the input file folder on the cloud computing platform file system 202, as well as "hadoop fs-put 'filelist' Input/sqrt" to store the calculation data into the input file folder. At the time, the input file folder is distributed to the cloud computing platform file system 202 in each of the servers.

In step S605, the server calculation module 126 may control each of the node servers (114-1 to 114-4) to create a plurality of mapreduce tasks corresponding to a calculation job, access the calculation data in the input file folder, and distributively execute the mapreduce tasks by using the mapreduce frame 204 to obtain a plurality of calculation results.

For example, in an exemplary embodiment of the invention, the server calculation module 126 may use the mapreduce frame 204 to execute a square root calculation for the calculation data. More specifically, the server calculation module 126 may control the data node 202c in each of the node servers (114-1 to 114-4) to access the calculation data in the input file folder. Particularly, the mapreduce task is composed of a mapper and a reducer. When the mapper is executed, the server calculation module 126 may control the task tracking module 204b in each of the node servers (114-1 to 114-4) to execute the square root calculation for the calculation data in the input file folder, and the calculation are then counted and arranged when the reducer is executed. It should be noted that, assignment of the calculation data is done by the server calculation module 126 controlling the job tracking module 204a in the main server to assign a plurality of mapreduce tasks to the task tracking module 204b in each of the node servers (114-1 to 114-4), such that each of the node servers (114-1 to 114-4) is provided with even amount of tasks.

In step S607, the calculation result processing module 128 may store the calculation results. More specifically, the calculation result processing module 128 may use a distributed data storage system command (Hive command) such as "LOAD DATA INPATH 'Output/sqrt'INTO TABLE SquireRoot" to write the calculation results into the database located in the distributed data storage system 206. Particularly, the distributed data storage system 206 may inquire for the calculation results stored in the database by executing the query language based on SQL. For instance, the calculation result processing module 128 may use a command "SELECT*FROM SquireRoot SORT BY key" to read the calculation results, so as to ensure that the calculation results are correctly written.

Thereafter, in step S609, the calculation result analysis module 132 may analyze the calculation results to verify the quality of each of the node servers (114-1 to 114-4).

Based on above, in the method for verifying quality of server, the calculation data is stored into the cloud computing platform file system on the cloud computing platform first. Therefore, the calculation data may be distributed over each server in the server cluster, so that each server is required to constantly exchange information to one another through the network. Accordingly, said method is capable of performing comprehensive verification for calculations, network communications, memory accessing and writing/reading of storage devices in each server in numerous server clusters, thereby ensuring quality of servers. In addition, numerous servers are serially connected through the cloud computing platform in the invention for conformably verifying quality of numerous servers in the server cluster, which may effectively improve performance for verifying quality. Further, the operation condition of each server may be obtained through the registry generated after the calculation job is executed, so as to improve operation quality of the servers.

What is claimed is:

1. A method for verifying quality of server, used for verifying a plurality of servers constructed in a server cluster, and the method for verifying quality of server comprising: installing a cloud computing platform in the servers in the server cluster, wherein the cloud computing platform comprises a cloud computing platform file system and a mapreduce frame; creating an input file folder on the cloud computing platform file system and storing a calculation data into the input file folder; creating a plurality of mapreduce tasks corresponding to a calculation job by the servers, accessing the calculation data in the input file folder, and distributively executing the mapreduce tasks by using the mapreduce frame to obtain a plurality of calculation results; storing the calculation results; and analyzing the calculation results to verify a quality of each of the servers; wherein the servers comprise a main server and a plurality of node servers, wherein the step of creating the mapreduce tasks corresponding to the calculation job by the servers, accessing the calculation data in the input file folder, and distributively executing the mapreduce tasks by using the mapreduce frame to obtain the calculation results comprises: dividing the calculation job into the mapreduce tasks by the main server; assigning the mapreduce tasks to the node servers; and executing the mapreduce tasks respectively by the node servers.

2. The method for verifying quality of server as recited in claim 1, further comprising: after installing the cloud computing platform in the servers in the server cluster, writing a name of the main server and names of the node servers into a corresponding profile; restarting the cloud computing platform installed in the servers; determining whether the node servers are connected to the main server; and if the node servers are not connected to the main server, restarting the cloud 10 computing platform.

3. The method for verifying quality of server as recited in claim 2, wherein the cloud computing platform further comprises a distributed data storage system, wherein the step of storing the calculation results comprises: transmitting the calculation results to the distributed data storage system and storing the calculation results into a database.

4. The method for verifying quality of server as recited in claim 3, wherein the step of analyzing the calculation results to verify the quality of each of the servers comprises: determining an operation condition of each of the servers during execution of the calculation job according to a registry generated after the calculation job is executed by the server cluster.

5. The method for verifying quality of server as recited in claim 1, wherein the step of executing the mapreduce tasks respectively by the node servers comprises: reading the calculation data from the input file folder by the node servers and executing a plurality of mappers in the mapreduce tasks for the calculation data; and executing a plurality of reducers in the mapreduce tasks according to the calculation results by the node servers.

6. The method for verifying quality of server as recited in claim 5, wherein the calculation job is a square root calculation.

7. A system for verifying quality of server, used for verifying a plurality of servers constructed in a server cluster, and the system comprising:
   a processor;
   a memory;
   a calculation platform installing module, configured to install a cloud computing platform in the servers, wherein the cloud computing platform comprises a cloud computing platform file system and a mapreduce frame;
   a file and data creating module, configured to create an input file folder on the cloud computing platform file system and store a calculation data into the input file folder;
   a server calculation module, configured to control each of the servers to create a plurality of mapreduce tasks corresponding to a calculation job, access the calculation data in the input file folder, and distributively execute the mapreduce tasks by using the mapreduce frame to obtain a plurality of calculation results;
   a calculation result processing module, configured to process and store the calculation results; and
   a calculation result analysis module, configured to analyze the calculation results to verify a quality of each of the servers; wherein the servers comprise a main server and a plurality of node servers, wherein the server calculation module is further configured to control the main server to divide the calculation job into the mapreduce tasks, wherein the server calculation module is further configured to control the main server to assign the mapreduce tasks to the node servers, wherein the server calculation module is further configured to control the node servers to execute the mapreduce tasks respectively.

8. The system for verifying quality of server as recited in claim 7, wherein the system further comprises a server setting module, 10 wherein the server setting module is configured to, after installing the cloud computing platform in the servers in the server cluster, write names of the main server and the node servers into a corresponding profile, wherein the server setting module is further configured to restart the cloud computing platform installed in the servers, wherein the server setting module is further configured to determine whether the node servers are connected to the main server, wherein if the node servers are not connected to the main server, the server setting module restarts the cloud computing platform.

9. The system for verifying quality of server as recited in claim 8, wherein the cloud computing platform further comprises a distributed data storage system, wherein the calculation result processing module is further configured to transmit the calculation results to the distributed data storage system and store the calculation results into a database.

10. The system for verifying quality of server as recited in claim 9, wherein the calculation result analysis module is further configured to determine an operation condition of each of the servers during execution of the calculation job according to a registry generated after the calculation job is executed by the server cluster.

11. The system for verifying quality of server as recited in claim 7, wherein the server calculation module is further configured to control the node servers to read the calculation data from the input file folder and execute a plurality of mappers in the mapreduce tasks for the calculation data, wherein the server calculation module is further configured to control the node servers to execute a plurality of reducers in the mapreduce tasks according to the calculation results.

12. The system for verifying quality of server as recited in claim 11, wherein the calculation job is a square root calculation.

* * * * *